United States Patent [19]
Edwards

[11] 3,947,205
[45] Mar. 30, 1976

[54] APPARATUS FOR FORMING NON-NESTABLE CONTAINERS

[75] Inventor: Bryant Edwards, Clarendon Hills, Ill.

[73] Assignee: Illinois Tool Works Inc., Chicago, Ill.

[22] Filed: Oct. 9, 1974

[21] Appl. No.: 513,427

Related U.S. Application Data

[63] Continuation of Ser. No. 328,197, Jan. 31, 1973, abandoned, which is a continuation of Ser. No. 12,652, Feb. 19, 1970, abandoned.

[52] U.S. Cl. .............. 425/387 B; 264/92; 264/94; 29/9 T; 425/DIG. 208; 425/388
[51] Int. Cl.² ............................ B29D 23/03
[58] Field of Search .... 425/384, 385, 387 B, 387 R, 425/388, 390, 393, DIG. 218, 231, 233, 232, 214, 403; 264/94, 97, 327, 92, 320, 325; 65/355, 356

[56] References Cited
UNITED STATES PATENTS

| | | |
|---|---|---|
| 3,676,542 | 7/1972 | Maltby .............................. 264/327 |
| 3,770,860 | 11/1973 | Amberg et al. ................. 425/387 B |
| 3,776,682 | 12/1973 | Parmann ............................ 425/393 |
| 3,807,027 | 4/1974 | Heisler .............................. 425/392 |

*Primary Examiner*—Ronald J. Shore
*Assistant Examiner*—R. J. Charvat
*Attorney, Agent, or Firm*—E. L. Benno; R. W. Beart

[57] ABSTRACT

Reshaping of a nestable plastic container of substantially uniform wall thickness into a non-nestable container of substantially uniform wall thickness by substantially uniform radial and axial enlargement thereof. The nestable plastic container is heated below its rim portion to a predetermined temperature where the nestable container is readily deformable, the thus heated nestable container then being fixedly supported in a mold cavity having a non-nestable inner wall configuration, and subsequently expanding the nestable container against the non-nestable inner wall configuration of the mold cavity by differential fluid pressure to form a non-nestable container product.

5 Claims, 7 Drawing Figures

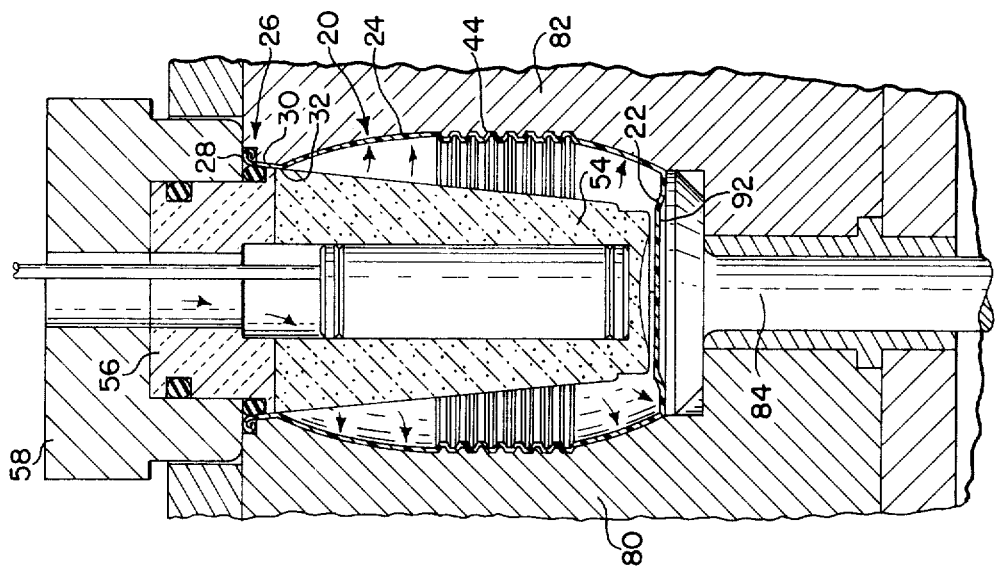
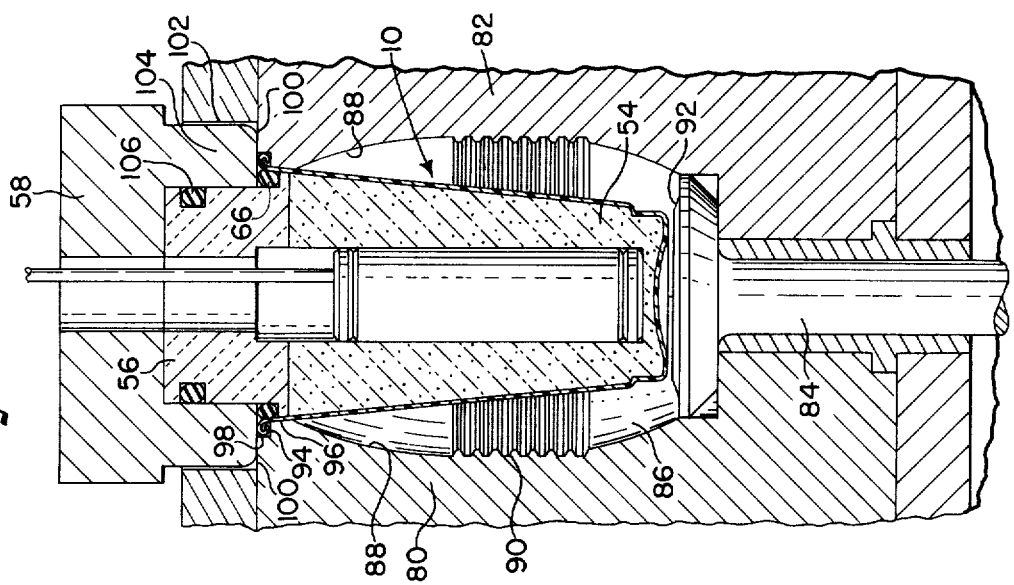
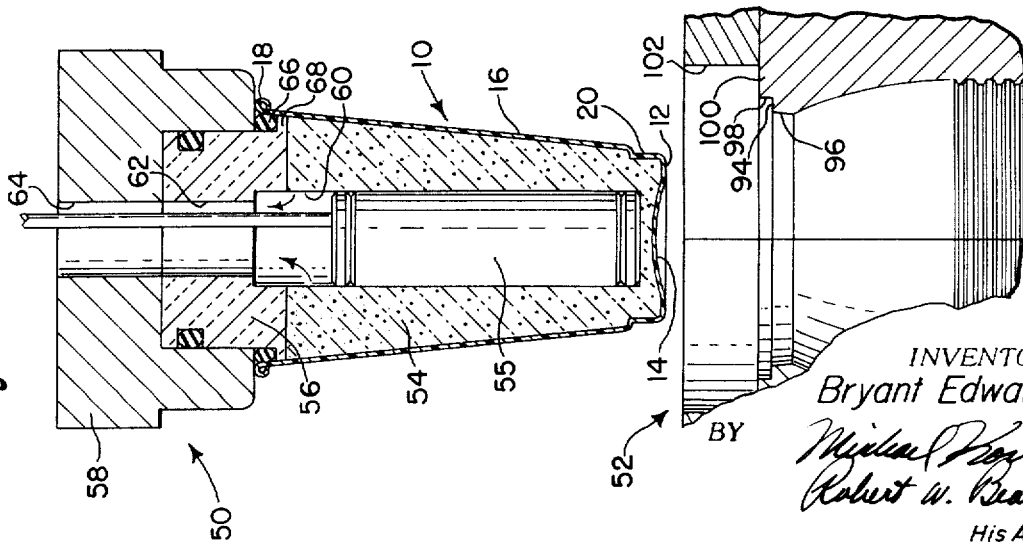

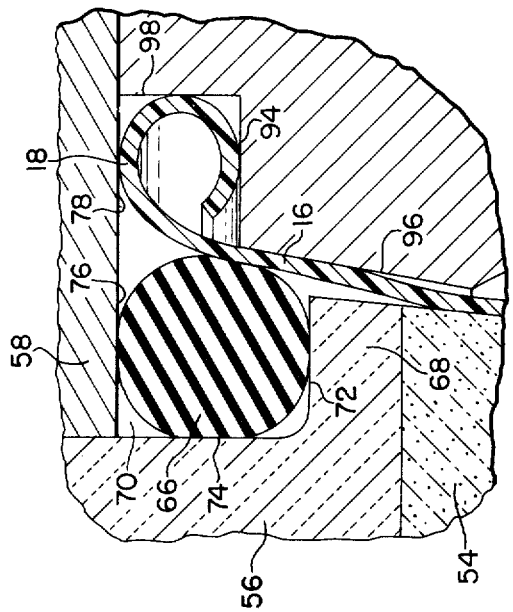
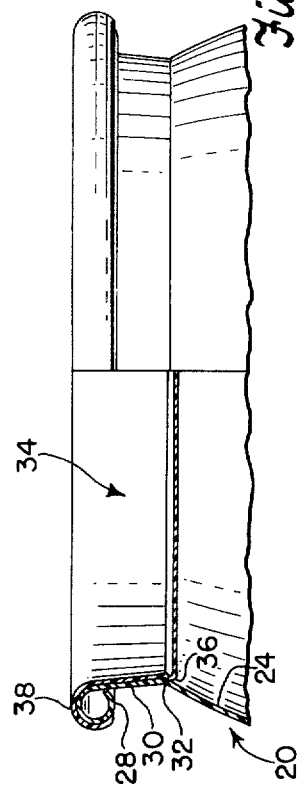
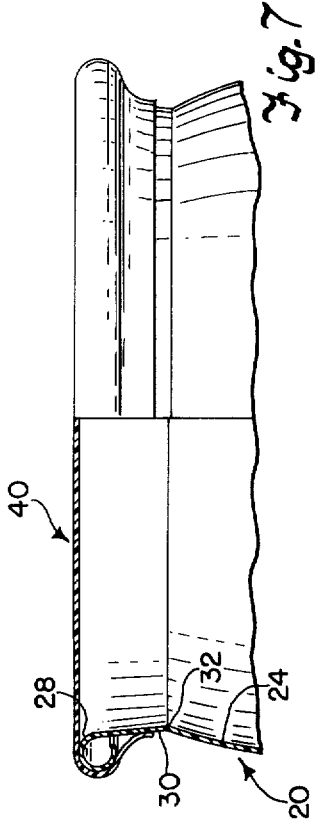
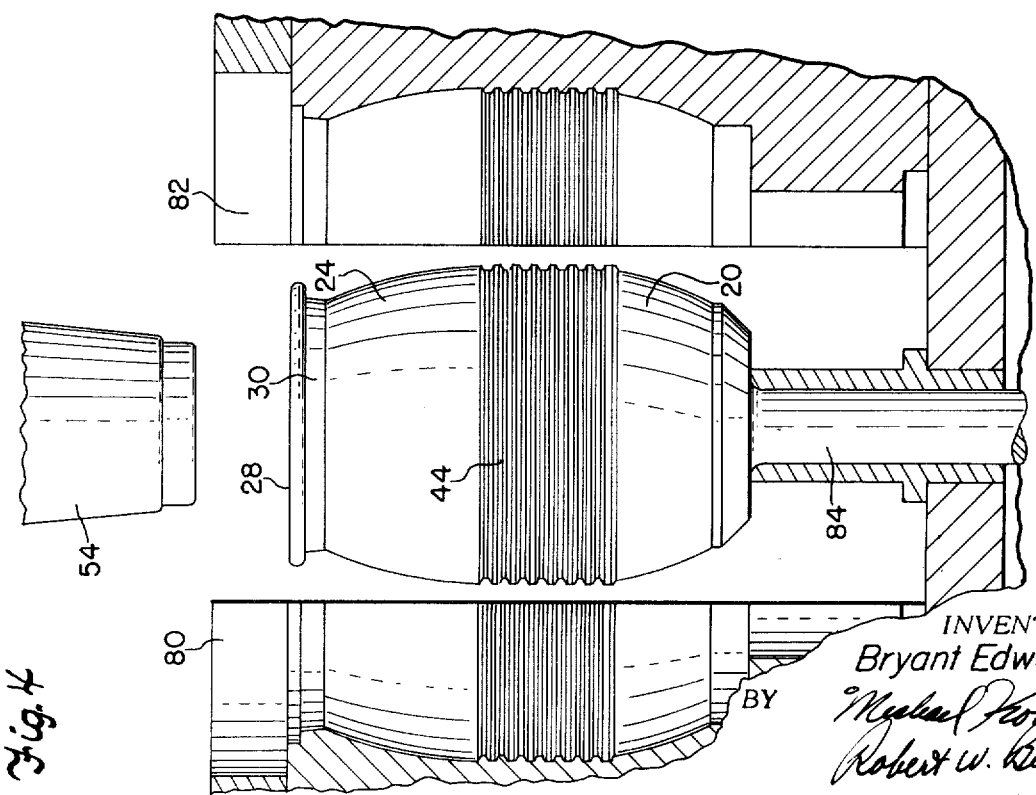

APPARATUS FOR FORMING NON-NESTABLE CONTAINERS

This is a continuation of application Ser. No. 328,197 filed Jan. 31, 1973, and now abandoned, which was a continuation of application Ser. No. 12,652 filed Feb. 19, 1970, and now abandoned.

SUMMARY OF THE INVENTION

Molding operations for fabricating reduced or small necked plastic bottles, containers and the like have built upon the experiences of the glass blowing art where liquid melted glass in the shape of a parison is injected or introduced into a split mold cavity having a configuration of the ultimate article to be formed, the parison then being subjected to air pressure, through a tube, needle or the like to expand the parison against the inner wall of the split mold cavity. After being cooled against the inner wall of the mold cavity, the final article may then be removed upon opening of the split mold cavity.

In the present state of the art of blow molding disposable plastic bottles or containers having small or reduced necks, there are several ways in which the material is introduced into a mold cavity. In addition to depositing an unshaped parison into the mold cavity, the prior art has included the introduction of a partially shaped parison, the insertion of an extruded tube, and in some instances, a preformed or preshaped article is deposited in the mold cavity. The present invention is directed to the type of reshaping operation where a nestable container, suitable for shipping and storage purposes, is introduced into a mold cavity having a non-nestable inner wall configuration, and the nestable container is subsequently reshaped by differential fluid pressure into a non-nestable container product.

It is well known that blow molding operations inherently involve numerous problems in the manufacture of bottles, containers and the like. Flash is frequently formed about the outside surface of the neck portion and outer walls of the bottle or the container due to the pressing of excess material in the seam areas of the split mold when the parison or extruded tubing is reshaped. In some cases, flash has been removed by automatic deburring equipment prior to the removal of the bottle from the mold to avoid expensive, time-consuming operations normally associated with hand labor. Improper centering of the parison, tubing or preformed article has also resulted in the formation of flash, not to mention the molding of thick and thin areas in the ultimately formed article which may result in undesirable weaknesses at stress points in the container.

While the above disadvantages may be alleviated, at least in part, by the introduction of a closed end parison into a mold cavity under known techniques, difficulty still persists in the proper seating or centering of the preform and additional problems are created such as the proper sealing of the preform in the mold cavity to avoid air leaks and the attendant non-uniform expansion that will result. Furthermore, the relative complexity of the equipment and its cost have restricted the potential use in the packaging industry of reshaped containers for both the small and large users of bottles or containers.

The present invention has the advantage that the preform may be fabricated as a nestable container by a manufacturer who can provide the proper quality standards that are necessary for the preformed product. The nestable container can then be shipped by the preform maunfacture to the bottle fabricator where a simple, economical technique may be employed to fabricate articles of the desired shape.

Accordingly, it is an object of the present invention to overcome the inherent disadvantages of current blow forming operations and the deficiencies in the products resulting therefrom.

More specifically, it is an object of the present invention to provide a method and apparatus for fabricating nestable plastic containers of substantially uniform will thickness into uniquely configured non-nestable containers of substantially uniform wall thickness.

Another object of the present invention is a method and apparatus which enables economic fabrication of non-nestable articles of predetermined shape having the desired thickness and strength.

These and other objects and advantages of the present invention are attained by providing a non-nestable, thermoplastic container of substantially uniform wall thickness which is reshaped from a nestable, thermoplastic container of substantially uniform wall thickness by both radial and axial enlargement thereof. The procedural steps and structural elements for manufacturing a non-nestable container include the steps or means of forming a nestable container with a rim portion of predetermined diameter at the open upper end thereof, heating the nestable container below its rim portion to a predetermined temperature where the nestable container is readily deformable, fixedly supporting the heated nestable container in a mold cavity having a non-nestable inner wall configuration, sealing off the heated nestable container in the vicinity of its rim portion from the mold cavity, and thereafter expanding by differential fluid pressure the heated nestable container against the non-nestable inner wall configuration of the mold cavity to form a non-nestable container with a rim portion of the same predetermined diameter at its open upper end.

BRIEF DESCRIPTION OF THE DRAWINGS

FIG. 1 is a semidiagrammatic sectional view of an apparatus constructed in accordance with the teachings of the present invention, which is also capable of carrying out the method of the present invention, and illustrating the placement of a nestable plastic container on a heated upper mold or mandrel;

FIG. 2 is a view similar to FIG. 1 and showing the disposition of the nestable container and mandrel within a mold cavity having a non-nestable inner wall configuration;

FIG. 3 is a view similar to FIGS. 1–2 and illustrating the manner in which the nestable container is expanded into a non-nestable container product;

FIG. 4 is a view similar to FIGS. 1–3 and depicting the removal or separation of the non-nestable container from the apparatus;

FIG. 5 is an enlarged fragmentary sectional view showing a portion of the apparatus in greater detail;

FIG. 6 is a combined sectional and side elevational view of the non-nestable container with a snap-in closure applied to the open end thereof; and FIG. 7 is a combined sectional and side elevational view of a non-nestable container with an overcap applied over the open upper end and extending around and below the rim portion thereof.

DESCRIPTION OF THE PREFERRED EMBODIMENTS

Before considering the details of the preferred embodiments, it will be understood that the present invention is directed to the manufacture of a wide variety of shapes and sizes of hollow articles made of organic plastic material. The invention is not limited to a particular type of organic material, but must have the characteristic of being rendered plastic by heat in order to permit it to be shaped into hollow articles such as bottles or containers. Several types of preferred materials include polystyrene, polyethylene, and polyvinyl chloride; but other materials within the general parameters outlined above may also be utilized.

It is also to be understood that while the nestable container preform is preferably made by sheet thermoforming techniques, it is conceivable that injection molding, blow molding and the like may be employed.

The nestable container 10 illustrated in the drawings is preferably molded by a technique, commonly referred to as sheet thermoforming, where the application of heat and pressure causes a web of thermoplastic material to be deformed to the desired shape. One particularly efficacious technique for thermoforming nestable containers is disclosed in U.S. Pat. No. 2,891,280 where a heated web of thermoplastic material is first mechanically predrawn by a mandrel and then subjected to air under pressure within the confines of a mold cavity, thereby causing the preformed shape to conform to the outline of the mold cavity. While it is, of course, possible to thermoform a non-nestable container as illustrated in U.S. Pat. No. 3,259,942, it has been found that the equipment and standards which are necessary to produce products of consistent quality has discouraged many of the non-nestable container users. As a result, there has been a long felt need for a technique whereby accurately formed products of substantially uniform wall thickness could be formed by economical and simple molding techniques.

The nestable plastic container 10, as best seen in FIGS. 1-2 of the drawings, include a bottom wall 12 which is configured in central axial cross section to enhance its resistance to deformation, as can be seen from the slightly upwardly bowed or concave section 14. The bottom 12 may be otherwise configured to enhance its resistance to deformation such as by thickening the bottom or by impressing other reinforcing structure therein. The container 10 further includes an upwardly and outwardly tapering side wall 16 which extends from the bottom wall to an open upper end. At the open upper end there is provided a rim portion 18 in the form of a radially outwardly directed rolled rim or curled lip. It will be apparent that various types of rim constructions may be employed, including thickened or solid bead constructions, flat lips or lips of any other construction or configuration which offer sufficient increased lateral or radial width at the open upper end of the container 10 to enhance the lateral strength at the open upper end.

The diameter of the container 10 at the open upper end in the vicinity of the rim portion 18 is preferably of sufficient diameter to permit drinking from one edge thereof. As will be explained in the molding technique to be described below, the rim portion 18 preferably remains undeformed during the reshaping of the nestable container to a non-nestable container construction. Of course, it is to be understood that the ultimately formed non-nestable container product may be used for containing products not otherwise brought into direct contact with a user's lips; and in this regard, the predetermined diameter at the open upper end of the container which is selected will take into consideration the products that are contained therein.

In order to limit telescoping between adjacent nested containers 10 in a stack of similarly configured containers, each nestable container 10 is preferably provided with a stacking means 20 in the side wall 16 thereof. The stacking means 20 may be of the type depicted in U.S. Pat. No. 3,139,213 for limiting telescoping between thin-walled, nestable products of substantially uniform thickness with which the present invention is concerned. It will be understood, however, that a stacking means or configuration may be incorporated at other places in the side wall, in the bottom wall, or at the rim of the container 10, as may be desired.

In thermoforming nestable containers 10, such as by the thermoforming process disclosed in U.S. Pat. No. 2,891,280, the nestable container 10 is formed as a thin-walled container in the range of 0.01 inches in thickness. The range of thicknesses in thin-walled plastic containers may be on the order of 0.008–0.025 inches in thickness, but it is to be understood that the range of thickness is given for exemplary purposes only. The thin-walled, nestable containers 10 are also of substantially uniform thickness in the sense that the inner and outer surfaces of the container have corresponding contours. Thus, variations in thickness caused by the thermoforming process will be considered to fall within the generally understood definition of substantially uniform thickness in the thermoforming field.

Nestable containers 10 are preferably thermoformed by a manufacturer who has the necessary equipment and quality standards to consistently produce thin-walled, plastic nestable containers of substantially uniform thickness. The nestable containers 10 are then placed in stacks of fifty to one hundred containers, for example, and then shipped to a non-nestable container user who will fill the non-nestable containers with a desired product for distribution in the market place. At the plant of the non-nestable container user, there will be provided a machine which will reshape the nestable container 10 into a non-nestable container product 20 as best seen in FIGS. 3–4 and 6–7 of the drawings. For the discussion that is to follow a non-nestable container product is a product which is not designed to provide substantially complete nesting, as in the case of nestable containers, although a partial nesting may occur between limited areas of the top and bottom of adjacent stacked non-nestable containers. Thus, a non-nestable container product is one in which there is no inherent nesting characteristics between adjacent containers.

While freedom of design will permit a great variety of shapes and sizes of non-nestable containers to be formed, there is illustrated at FIGS. 3–4 and 6–7 of the drawings a preferred form of non-nestable container construction. The non-nestable container 20 includes a bottom wall 22 which is preferably axially upwardly directed at least in part to enhance its resistance to deformation by the product contained in the container 20. The container 20 further includes a radially outwardly directed generally bulbous shaped side wall 24 which curves from the bottom wall 22 to a rim area 26 of the container which includes the rim portion 28 and a downwardly and inwardly tapering skirt or wall 30 which connects the rim portion 28 to the bulbous shaped side wall 24. The juncture between the downwardly and inwardly (or upwardly and outwardly) tapering skirt or wall 30 and the bulbous shaped side wall 24 provides a radially inwardly extending offset shoulder 32.

The rim portion 28 is maintained during the reshaping operation from the nestable container 10 to the non-nestable container product 20 of the same predetermined diameter as the nestable container 10. In this way, it is possible to provide a predetermined diameter at the open upper end of the container which has a diameter sufficient to permit the lips of the user to engage one edge thereof. The dimension of the open upper end of the non-nestable container 20 will be governed largely by the product to be contained therein, but it will be understood that it will be possible according to the techniques disclosed herein to maintain the dimensional characteristics of the rim portion as may be desired.

The rim area 26 of the container 20 is adapable for use with both a snap-in lip or overcap as may be desired. In FIGS. 6-7 of the drawings the use of a snap-in lid and an overcap is illustrated. Specifically, in FIG. 6 of the drawings a snap-in lid 34 is shown in assembled relationship relative to the rim area 26 of the non-nestable container. The snap-in lid 34 includes an enlarged bead 36 at the lower end thereof which has a diameter slightly larger than the radially inwardly offset shoulder 32 of the container 20. The dimensional arrangement of the parts is such that the lid 34 may be snapped in the rim area 26 of the container below the radially inwardly offset shoulder 32 thereof. The snap-in lid 34 is guided or centered as it is assembled relative to the rim area of the container by the downwardly and inwardly tapering wall or skirt 30. If desired, the snap-in lid 34 may be provided with a generally U-shaped lid section 38 which is designed to fit over the rim portion 28 of the container 20 in a manner well known in the art.

The rim area 26 of the container 20 also facilitates the use of an overcap 40 as illustrated in FIG. 7 of the drawings. The overcap 40 may have a formed shape or, as depicted in FIG. 7 of the drawings, may comprise a crimped lid made from paper, foil, or laminated paper, foil, or plastic constructions where the outer peripheral portions 42 of the overcap are crimped beneath the radially outwardly directed rim portion 28. It will thus be apparent that the non-nestable container 20 readily adapts itself to known capping technology which is readily accessible.

In the container 20 which is illustrated in the drawings, the generally bulbous shaped side wall 24 is provided with a plurality of rib portions 44 in the area of the container which would be generally gripped by a user. Other types of reinforcing patterns such as flutes (vertically oriented), grid-like patterns and the like may be employed to enhance the lateral rigidity of the non-nestable container in the area in which it is to be gripped by a user. In the illustrated container 20 it is to be further noted that the maximum diameter of the bulbous shaped side wall 24 exceeds the diameter at the rim area 26 of the container including the radially outwardly directed rim portion 28 thereof. Preferably, the ribs 44 are provided in the area of maximum diametrical extent of the bulbous shaped portion. It will be apparent that the non-nestable container is not limited to a bulbous shaped side wall 20, but may include various designs and shapes which are consistent with products that can be formed by split mold technology which is used in the non-nestable container fabricating technique. It has been found, however, that the generally bulbous shape is at least one preferred form of non-nestable container which affords good lateral rigidity in a thin-wall container of the type to be formed.

Reference is now made to FIGS. 1–4 of the drawings for the reshaping technique that is employed in converting the nestable container 10 to the non-nestable container product 20. The illustrated apparatus includes cooperating upper and lower mold means 50, 52 respectively which cooperate to form the non-nestable container 20.

The upper mold means 50 includes a mandrel 54 having an outside shape generally complementary to the inside shape of the nestable container 10, an insulator member 56, and a mounting base 58 to which the mandrel and insulator 54, 56 respectively are mounted. The mounting base 58 is reciprocated by means (not shown) to move the upper mold means 50 relative to the lower mold means 52.

The mandrel 54 is preferably of the type which may be heated as well as permit the ingress and egress of air therethrough. For this purpose, a sintered bronze material which provides a porous structure of the heat conducting type may be utilized. A heater element 55 is mounted with a sintered opening 60 of the mandrel for introducing sufficient heat to the sintered bronze material for heating the nestable container 10 to a temperature permitting ready deformation thereof. It will be apparent that other types of heating elements 55 may be associated with the mandrel 54, but this arrangement of parts performs in a very satisfactory manner to convey the necessary heat and at the same time permit air to introduce through the remainder of the channel 50 in the mandrel 54, as will be presently described.

In order to convey air through the mandrel 54, a plurality of interconnecting channels or openings 60, 62, and 64 are provided respectively in the mandrel, insulator and mounting base 54, 56, and 58 respectively.

In the form illustrated in the drawings, the mandrel 54 has an outer shape conforming essentially to the inner shape of the nestable container 10. When heat is thus applied through the mandrel 54, the nestable container 10 will be substantially uniformly heated throughout all areas which are in close proximity relative to the mandrel 54. In order to retain the nestable container 10 relative to the mandrel 54 and encourage substantially uniform heating of the nestable container throughout, a vacuum or negative pressure is preferably established through the opening 60, 62 and 64 by a suitable source (not shown) which will draw the nestable container in close conforming relationship relative to the outer shape of the mandrel 54. To prevent air leaks, a seal, in the form of an O-ring, is provided and is illustrated as being mounted in the insulator member 56 to prevent undesired deformation or hardening of the elastomeric sealing member shown in the form of an O-ring 66, the O-ring 66 is mounted over the radially outwardly extending flange 68 of the insulator and is trapped within the recess 70 defined by the upper surface 72 of the radially outwardly directed flange 68, an outer side surface 74 of the insulator member 56 located immediately above and interconnected to the upper surface 72, and a lower face portion 76 of the lower face 78 of the mounting base 58.

The arrangement and mounting of the O-ring seal 66 is best illustrated in FIG. 5 of the drawings. The O-ring seal 66 has a diameter slightly greater than the dimensions of the recess 70 so that it is slightly compressed or flattened when mounted in the recess to extend slighty beyond the end or extremity of the radially outwardly directed flange 68. It will be noted that the end or extremity of the radially outwardly directed flange 68 of the insulator member 56 is provided with an outer peripheral surface which is complementary to and merges with the upwardly and outwardly tapering surface of the mandrel 54. Thus, the O-ring 66 is capable of extending beyond the outer surface of the flange 68 to engage the nestable container 10 in the vicinity of the rim portion 18 thereof. As a result, the nestable container 10 is sealed from the outside atmosphere when mounted on the mandrel 54.

As the nestable container 10 is heated by the mandrel 54 in the stage of the molding operation illustrated in FIG. 1 of the drawings, it is important that little or no heat be transmitted to the area of the nestable container 10 in the vicinity of the rim portion 18. For this purpose, the radially outwardly directed flange 68 of the insulator 56 prevents sufficient heat from being conducted to the area of the container in the vicinity of the rim portion 18. This permits the rim portion 18 in the subsequent reshaping operation to retain its shape and enables the rim portion 18 to be utilized in the proper centering and sealing of the nestable container relative to the lower mold 52 as will be described.

The upper and lower mold means 50, 52 are relatively advanced toward one another preferably after the nestable container 10 has been heated to a suitable temperature where it is then readily deformable. The lower mold means 52 comprises a split mold cavity, illustrated as two split mold halves 80, 82 in the drawings (or split quarter sections, etc.), and a knock-out plunger or base 84 which is received between the split mold halves 80, 82 at the lower end thereof. The inner wall surfaces of the split mold halves 80, 82 and the upper surface of the knockout base or plunger 84 defines a mold cavity 86 having a non-nestable inner wall configuration which is complementary to the outer shape of the non-nestable container 20. Specifically, the split mold halves 80, 82 are provided with a mirror image inner wall surface 88 having a plurality of rib shoulders 90, which are adapted to form the bulbous shaped side wall 24 having the plurality of ribs 44 in the nestable container 20. The upper surface 92 of the knock-out base or plunger 84 conforms in shape to the bottom wall 22 of the nestable container 20 as previously described.

When the upper and lower mold means 50, 52 are telescoped relative to one another, as illustrated in FIG. 2 of the drawings, the heated nestable container 10 is fixedly mounted or supported within the mold cavity 86. Each of the split mold halves 80, 82 are provided with a semicircular, horizontally extending surface 94 which engages and underlies the rim portion 18 of the nestable contaner. Extending downwardly and inwardly from the semicircular surfaces 94 are a pair of mirror image, frusto-conical surfaces 96, which conform, at least in part, to the upwardly and outwardly tapering side wall 16 of the nestable container 10 in the immediate vicinity of the rim portion 18. Each of the mold halves 80, 82 are further provided with a mirror image, semicylindrical, generally vertically directed surface 98 which extends upwardly from the horizontally extending, semicircular surfaces 94. The surfaces 94, 98 are arranged to confine the rim portion 18 in a manner to be described below.

Each of the mold halves 80, 82 are also provided with a semi-circular, horizontally extending surface 100 and a semicylindrical, vertically directed surface 102, which define a recess of receiving the enlarged section 104 of the mounting base 58. This is best illustrated in FIGS. 2–3 of the drawings where the upper and lower mold means 50, 52 are assembled or telescoped relative to one another. The enlarged section 104 of the upper mold means cooperates with the surfaces 100, 102 of the mold halves 80, 82 to provide a proper centering of the mandrel 54 relative to the mold cavity 86. This is important from the standpoint of insuring accurate and consistent manufacture of non-nestable container products.

When the upper and lower mold means 50, 52 are relatively telescoped to one another, the O-ring 66 also engages the side wall 16 of the nestable container in the vicinity of the rim portion 18. Since the downwardly and inwardly tapering surface 96 of each mold hald 80, 82 conformed at least in part to the downwardly and inwardly tapering side wall 16 of the nestable container 10, it is possible to provide a pinch seal of the container side wall 16 in the immediate vicinity of the rim portion 18, as is best illustrated in FIG. 5 of the drawings. The O-ring 66 which is compressed in the recess 70, as previously described, is further compressed by the downwardly and inwardly tapering surfaces 96 of the mold halves 80, 82 to thereby provide the pinch seal as indicated clearly in FIG. 5 for the purpose of sealing off the container 10 from the mold cavity 86. The pinch seal takes place as the upper and lower mold means 50, 52 are brought into telescoping relationship, and this permits the vacuum to be terminated and a positive air pressure introduced by a suitable source (not shown) through the openings 60, 62, and 64 of the upper mold means through the porous structure of the mandrel 54 for expanding the heated nestable container 10 against the non-nestable inner wall configuration of the mold cavity 86 defined by the surfaces 88, 90, and 92 of the mold halves 80, 82. The mold halves 80, 82 are chilled or cool enough such that the expanded container will harden to the shape of the non-nestable inner wall configuration of the mold cavity 86. The expansion of the nestable container 10 into a non-nestable container product, through the introduction of air against the inner surface of the nestable container 10 is best illustrated in FIG. 3 of the drawings.

When suitably hardened, the nestable container 20 may be removed by the separation of the mold halves 80, 82 and the disassociation of the upper and lower mold means 50, 52 relative to one another. As depicted in FIG. 4 of the drawings, the ultimately formed non-nestable container product may then be removed by suitable product removal apparatus (not shown).

One of the important features of the present invention not heretofore described is the manner in which the rim portion 18 is engaged by the cooperating surfaces of the upper and lower mold means 50, 52 respectively. As best depicted in FIG. 5 of the drawings, the rim portion 18 of the nestable container 10 is contacted by the horizontally and vertically extending surfaces 94, 98 of the mold halves 80, 82 and a portion of the lower surface 78 of the enlarged section 104. The arrangement of the surfaces 94, 98 and 78 are such that the lip portion 18 of the nestable container will be accurately sized both axially and radially to the desired height and width of the rim portion 28 of the non-nestable container 20. Inaccuracies which are normally associated with the rim rolling or curling process of thermoformed containers, for example, are thus corrected by the sizing technique above described. This is advantageous in that the rim portion 28 of the non-nestable container 20 will be consistently and accurately formed to a shape which will provide proper fitting for a snap-in or overcap lid. The sizing technique further enhances the reliability of the capping equipment which can be used with the non-nestable container once filled with the desired product.

In addition to sizing the rim portion 18 of the nestable container, it will be apparent that a mechanical seal is also provided at the point where the rim portion 18 contacts the surfaces 94, 98 and 78 respectively, as is illustrated in FIG. 5 of the drawings. As will be apparent, this will aid in the sealing of the nestable container relative to the mold cavity during the expansion thereof into a non-nestable container product. If desired, a O-ring seal 106 may also be utilized between the insulator 56 and mounting base 58, as depicted in FIGS. 1–3.

When the rim portion 18 of the nestable container 10 is engaged by the surfaces 94, 98, and 78 there is also an assurance that the nestable container 10 will be properly seated and centered in the mold cavity 86. Not only does this enhance the accuracy and consistency in the formation of the non-nestable product, but also assures that the height of the product will be maintained within prescribed limits. As will be readily understood, the height of the non-nestable container 20 and the shape of the rim portion 28 are important during the capping operation.

In accordance with the teachings of the present invention, the method herein disclosed may be performed in the following manner: A thin-walled, nestable plastic container 10 with rim portion 18 is mounted upon the mandrel 54 and held in close conforming relationship thereto by vacuum established through the openings 60, 62, and 64 of the upper mold means 50. The O-ring 66 seals the nestable container 10 in the vicinity of the rim portion 18 to the mandrel from the outside atmosphere. A heating element 55 conducts heat through the mandrel 54 and heats the nestable container, held in close conforming relationship to the outer surface of the mandrel by the vacuum, to a sufficient temperature where it is readily deformable. The above described stages of the molding procedure are generally illustrated in FIG. 1 of the drawings.

When the nestable container 10 has been suitably heated, the upper and lower mold means 50, 52 respectively are relatively advanced and telescoped into one another, as depicted. The nestable container 10 is properly seated and centered relative to the mold cavity 86 by interengaging mold surfaces 100, 102 of the mold halves 80, 82 and the enlarged section 104 of the upper mold means 50. Further centering and seating of the nestable container 10 is provided by the engagement of the rim portion 18 thereof by the surfaces 94, 98 of the mold halves 80, 82 and the lower surface 78 of the mounting base 58.

The mechanical seal that is created by the rim portion 18 engaging the surfaces 94, 98 and 78 supplements the primary seal established through the pinch seal of the O-ring 66 against the side wall 16 of the nestable container trapped between the O-ring 66 and the inwardly and downwardly tapering surface 96 of the mold halves 80, 82. The sealing of the nestable container 10 relative to the mold cavity 86 occurs quite rapidly after the telescoping movement of the upper and lower mold means 50, 52 relative to one another. This then provides the desired environment for the subsequent expansion of the nestable container 10 into the non-nestable container product 20.

As depicted in FIG. 3 of the drawings, air introduced through the openings 60, 62 and 64 of the upper mold means 50 is transmitted through the porous structure of the mandrel 54 from a suitable air source (not shown) against the inner walls of the nestable container 10 to expand the heated nestable container against the non-nestable inner wall configuration of the mold cavity 86. The non-nestable container thus formed assumes an outer shape conforming to the non-nestable inner wall configuration of the mold cavity 86. Cooling of the non-nestable container to a hardened state occurs immediately after the container engages the wall surfaces of the mold halves 80, 82, and after a predetermined cooling period, the mold halves 80, 82 may be separated and the upper and lower mold means 50, 52 disassociated relative to one another as indicated in FIG. 4 of the drawings to permit removal of the non-nestable container 20 by suitable product removal means.

From the foregoing it will now be appreciated that the manufacture of nestable, thin-walled plastic containers of substantially uniform thickness into non-nestable containers of substantially uniform thickness may be greatly facilitated by the herein disclosed method and apparatus. Non-nestable containers may be produced of the desired substantially uniform thickness in a wide variety of shapes and sizes by consistently accurate and economical manufacturing techniques. The non-nestable container products incorporate lateral strength in a thin-walled product and offer ready adaptability to conventional capping techniques, and the ability to be handled and placed in shipping cases by conventional methods.

I claim:

1. An apparatus for forming a nestable container made of plastic material and having a rim portion of predetermined diameter at the open end thereof into a non-nestable container product comprising a mandrel of a shape generally complementary to the shape of said nestable container so that said nestable container is mountable on said mandrel in close conforming relationship thereto, said mandrel comprising a lower heated portion and an upper insulated portion, said insulated portion having an axial extent substantially limited to said internal rim portion of said nestable container, said mandrel further including elastomeric air sealing means on said insulated portion for resiliently air sealing said internal rim portion of said nestable container on said mandrel and vacuum means for holding the portion of said nestable container below said rim portion in close conforming relationship to said lower heated portion of said mandrel so that the portion of said nestable container below said rim portion is heatable on said mandrel to a predetermined temperature where said portion of said nestable container below said rim is readily deformable, a mold cavity having a non-nestable inner wall configuration and a temperature substantially below said predetermined temperature, said mold cavity being formed to have an open upper end capable of receiving and cooperating with said mandrel, the unheated rim portion of said nestable container and said sealing means to seal said rim portion from said mold cavity below said open upper end after said portion of said nestable container below said rim portion is heated to said predetermined temperature and said mandrel is received within said mold cavity, and means in said mandrel for thereafter expanding by differential fluid pressure the portion of said nestable container below said rim portion against the non-nestable inner wall configuration of said mold cavity to form a non-nestable container product with a rim portion of predetermined diameter at its open upper end.

2. The apparatus as defined in claim 1 wherein said cooperating means provide proper positionment of the nestable container within the mold cavity to assure uniform expansion of the nestable container into a non-nestable container product.

3. The apparatus as defined in claim 1 and said mandrel and said mold cavity including cooperating means for sizing the rim portion of the container to a maximum radial and axial dimension by axial compression thereof by the cooperating mold surfaces.

4. The apparatus as defined in claim 1 wherein the sealing means comprises an O-ring which is engaged by cooperating mold sections provided on the mandrel and mold cavity.

5. The apparatus as defined in claim 1 wherein the sealing means comprises an O-ring mounting in the insulating means of the mandrel.

* * * * *